United States Patent [19]

Horvath

[11] 4,398,389

[45] Aug. 16, 1983

[54] DEMAND TYPE POWER BRAKE SYSTEM

[75] Inventor: Robert A. Horvath, Dayton, Ohio

[73] Assignee: General Motors Corporation, Detroit, Mich.

[21] Appl. No.: 246,233

[22] Filed: Mar. 23, 1981

[51] Int. Cl.³ .............................................. F15B 7/00
[52] U.S. Cl. ........................................ 60/545; 60/431; 60/435
[58] Field of Search .................... 60/545, 547 R, 435, 60/431, 434

[56] References Cited

U.S. PATENT DOCUMENTS

| | | | |
|---|---|---|---|
| 1,997,062 | 4/1935 | Huffman | 60/548 |
| 2,374,909 | 5/1945 | Williams | 60/434 X |
| 3,901,342 | 8/1975 | Nunn, Jr. | |
| 4,224,832 | 9/1980 | Prohaska et al. | |

Primary Examiner—Arnold Rosenthal
Attorney, Agent, or Firm—D. D. McGraw

[57] ABSTRACT

A hydraulic power brake system has a pump driven through a variable torque magnetic clutch by an engine-drive pulley. A rheostat controlled by movement of the brake booster push rod varies the amount of current to the clutch to control the torque transmitted to the pump. The pump pressure output varies directly with clutch torque. Pump pressure is delivered to a closed center hydraulic booster. The pump does not operate when no braking effort is required.

4 Claims, 1 Drawing Figure

U.S. Patent    Aug. 16, 1983    4,398,389
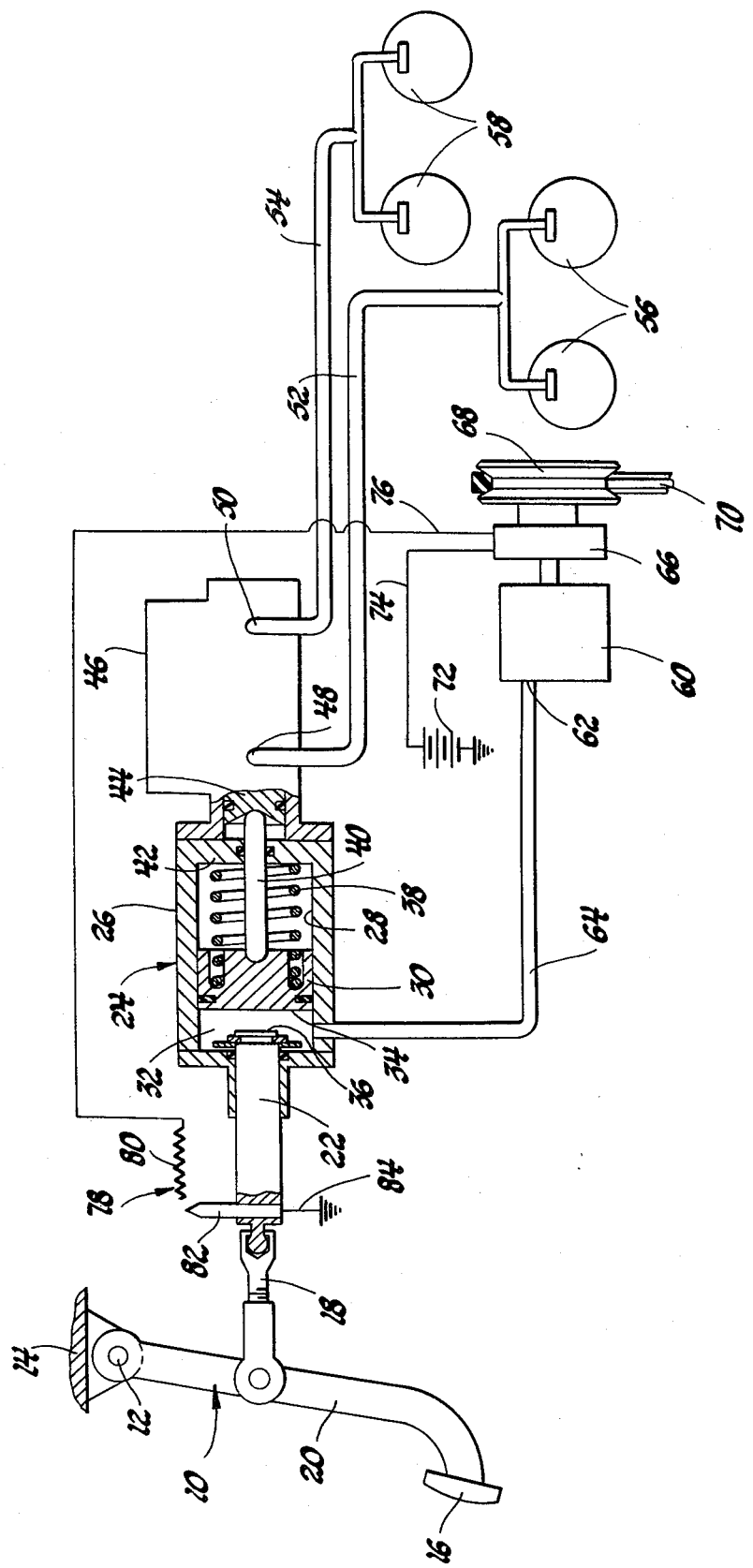

DEMAND TYPE POWER BRAKE SYSTEM

The invention relates to a power booster system, and particularly to one installed in a vehicle and having a brake booster and hydraulic brake circuits. The system in which the invention is embodied includes a power brake booster actuated by fluid pressure controlled by the vehicle operator through movement of a brake pedal assembly. The booster in turn actuates a master cylinder which pressurizes hydraulic brake fluid in brake circuits connected to the vehicle brakes so that the pressurized hydraulic brake fluid actuates those brakes. In the preferred embodiment disclosed, the booster is a hydraulic brake booster and power pressure is provided by a hydraulic pump driven through a variable torque clutch which is driven by the vehicle engine. The clutch is preferably of the magnetic type and is controlled by a variable rheostat which is in turn controlled by movement of the brake pedal. When the brake pedal is moved in the brake actuating direction, the rheostat varies the amount of electric current to the magnetic clutch in accordance with brake pedal movement. In turn, the clutch is energized to the extent required for transmission of the desired amount of torque from the vehicle engine to the pump. The pump is of a type that produces increased pressure output with increased torque transmitted to it. The fluid pressure generated by the pump is then transmitted to the closed center hydraulic booster. A plunger also connected with the brake pedal extends into the power chamber of the hydraulic booster and provides feedback to the brake pedal.

The pump is not operating when braking effort is not required. When braking effort is needed, the pump operates only to such an extent as to produce the required pressure for operating the brake system to obtain the desired braking action. Since the pump is not required to circulate fluid, even at nominal pressure, when the brake system is not actuated, no unnecessary energy losses are realized, increasing fuel economy as well as decreasing wear and tear on the pump.

IN THE DRAWING

The single FIGURE is a schematic representation, with parts broken away and in section, of a vehicle power brake system embodying the invention.

The brake system includes a brake pedal assembly 10 which is pivotally attached at 12 to a suitable portion 14 of the vehicle in which the system is installed. Pedal assembly 10 is so arranged that the vehicle operator may move the assembly in the brake actuating direction by exerting force on the pedal 16. A push rod 18 is attached to the pedal arm 20 and to a plunger 22, which is a part of the brake booster 24.

Booster 24 is schematically illustrated as including a housing 26 having a bore 28 formed therein. A power piston 30 is reciprocably and sealingly received in bore 28. The end of bore 28 into which plunger 22 extends has a power chamber 32 defined by a part of housing 26, the wall 34 of piston 30 and the end 36 of plunger 22. On the other side of piston 30 from chamber 32, a piston return spring 38 acts to continually urge the piston toward plunger 22. An output push rod 40 extends from piston 30 through the end wall 42 of housing 26 and engages a master cylinder piston 44 of the master cylinder 46. This master cylinder may typically be of the dual pressurizing chamber type and is illustrated as having brake fluid pressure outlets 48 and 50 respectively connected to brake circuits 52 and 54. One set of brakes 56 are actuated by brake fluid pressure in brake circuit 52 and another set of brakes 58 are actuated by brake fluid pressure in brake circuit 54.

A hydraulic pump 60 has its outlet 62 connected by conduit 64 to the power chamber 32 of brake booster 24. Pump 60 is mechanically driven through a variable torque clutch 66 which in turn is driven through pulley 68 and belt 70 from the vehicle engine, not shown. Clutch 66 is prefereably electrically controlled and is illustrated as being in an electric power circuit including a source of electrical energy schematically shown as battery 72, and an electrical lead 74 connecting one terminal of battery 72 to clutch 66. The other battery terminal is connected to ground. Another electrical lead 76 connects clutch 66 to the variable rheostat 78. The rheostat is schematically illustrated as including a variable resistor 80 engageable by a contact 82 positioned on plunger 22 so that linear movement of plunger 22 caused by actuation of the brake pedal assembly 10 decreases the resistance of resistor 80. Contact 82 is connected by electrical lead 84 to ground to complete the electric control circuit for clutch 66.

In operation, the vehicle brake circuits 52 and 54 and master cylinder 46 are filled with hydraulic brake fluid. The pump 60, conduit 64 and power chamber 32 are also filled with hydraulic fluid. Since the pump is not operating, there is no fluid pressure in chamber 32 or conduit 64. Therefore power piston 30 is positioned by return spring 38 substantially as shown. It is preferably positioned with a small amount of clearance between piston wall 34 and plunger end 36. Contact 82 is electrically disengaged with resistor 80 as to prevent current from flowing through the electrical circuit containing clutch 66 to energize the clutch. Therefore there is no mechanical drive through clutch 66 from pulley 68 to pump 60.

When the vehicle operator desires to actuate the vehicle brakes, he presses on pedal 16, pivoting pedal arm 20 rightwardly as seen in the drawing, transmitting a mechanical force through plunger 22, which moves rightwardly in power chamber 32. At the same time contact 82 electrically engages and moves along resistor 80 to decrease its resistance, energizing the electrical circuit and actuating clutch 66. The amount of torque transmitted by clutch 66 from pulley 68 to pump 60 depends upon the amount of electrical energization of the clutch. Thus the pump 60 begins to generate fluid pressure in conduit 64 and power chamber 32 in direct relation to the braking actuation demand of the vehicle operator. The pressure in power chamber 32 acts against piston wall 34 to move piston 30 against the force of return spring 38, moving push rod 40 to in turn move master cylinder piston 44 and generate brake actuating pressure in brake circuits 52 and 54, actuating brakes 56 and 58 in accordance with the amount of pressure in chamber 32. The pressure in chamber 32 also acts against the end of plunger 22, which has considerably smaller area than piston end 34, generating a feedback force on plunger 22 which is transmitted through push rod 18 and pedal arm 20 to the vehicle operator. The further that the vehicle operator moves pedal arm 20 in the actuating direction, the less electrical resistance is provided by resistor 80 and the greater torque transmission is obtained through clutch 66. The pump 60 generates additional pressure in power chamber 32, thus further applying the vehicle brakes 56 and 58 in the manner above described.

When the vehicle operator releases the brake pedal assembly 10, resistor 80 is again electrically disengaged by contact 82, clutch 66 is deenergized, and pump 60 is no longer driven. The return spring 38 moves piston 30 against the fluid in chamber 32, displacing that fluid back into pump 60 and allowing the booster and master cylinder assemblies to return to the brake released condition wherein no brake actuating pressures are provided in brake circuits 52 and 54. Thus the brakes 56 and 58 are released.

Should the engine not be running when brake actuation is required, the plunger end 36 will engage piston wall 34 so that the piston 30 is mechanically stroked to actuate the master cylinder 46. A suitable accumulator may be connected to conduit 64 and kept charged by pressure therein, and may be tripped upon sufficient pedal travel to provide a power brake apply if needed. The pump 60 is not of the fixed displacement type, so that it will permit the return of fluid under pressure upon brake release. This characteristic will also permit a tripped accumulator to actuate the brake for only a short time, then allow the pressure to drop. Any further braking is then accomplished by manual force mechanically transmitted as above described.

While in the preferred embodiment the booster 24 is a closed center hydraulic booster and clutch 66 is a variable torque magnetic clutch controlled through rheostat 78, it is to be understood that other types of pressure boosters may be used and other types of variable torque clutches which may be controlled in response to brake pedal movement may also be used.

The embodiments of the invention in which an exclusive property or privilege is claimed are defined as follows:

1. A power brake system comprising:
    a master cylinder,
    a power brake booster operable to actuate said master cylinder,
    a brake pedal movable to control the operation of said booster and to act through said booster on said master cylinder to actuate said master cylinder,
    a fluid pressurizing pump fluid connected to said booster to selectively provide fluid pressure thereto for operating said booster,
    a rotating driving power source,
    means selectively delivering driving power from said driving power source to operate said pump, said means including selectively and variably energizable clutch means for determining the amount of driving power delivered to said pump and thus controlling the amount of fluid pressure delivered by said pump to operate said booster,
    and control means for variably energizing said clutch means, said control means being responsive to brake actuating movement of said brake pedal to cause energization of said clutch means corresponding to the brake pedal position reflecting the amount of master cylinder actuation desired by the operator.

2. A power brake system comprising:
    a source of driving power including a rotatable driving member,
    a master cylinder,
    a hydraulic power brake booster operable to actuate said master cylinder,
    a brake pedal movable to control the operation of said booster and to act through said booster on said master cylinder to actuate said master cylinder,
    a hydraulic fluid pressurizing pump fluid connected to said booster to selectively provide hydraulic fluid pressure thereto for operating said booster,
    means selectively delivering driving power from said driving member to said pump, said means including selectively and variably energizable magnetic clutch means for determining the amount of driving power delivered to said pump and thus controlling the amount of hydraulic fluid pressure delivered by said pump to operate said booster,
    and a rheostat control for variably energizing said clutch means, said rheostat control being responsive to brake actuating movement of said brake pedal to cause electrical energization of said clutch means corresponding to the brake pedal position reflecting the amount of master cylinder actuation desired by the operation.

3. A power brake system in a vehicle having an engine, said system comprising:
    a master cylinder,
    a hydraulic power brake booster operable to actuate said master cylinder,
    a brake pedal movable to control the operation of said booster and to act through said booster on said master cylinder to actuate said master cylinder,
    a hydraulic fluid pressurizing pump fluid connected to said booster to selectively provide hydraulic fluid pressure thereto for operating said booster,
    a source of driving power including a pulley continuously driven by said vehicle engine,
    means selectively delivering driving power from said continuously driven pulley to operate said pump, said means including selectively and variably energizable magnetic clutch means for determining the amount of driving power delivered to said pump and thus controlling the amount of hydraulic fluid pressure delivered by said pump to operate said booster,
    and a rheostat control for variably energizing said clutch means, said rheostat control being responsive to brake actuating movement of said brake pedal to cause electrical energization of said clutch means corresponding to the brake pedal position reflecting the amount of master cylinder actuation desired by the operator,
    said rheostat control acting with brake actuating movement of said brake pedal to apply and then increase electrical energy from a source of same to said magnetic clutch means to increase the driving power through said clutch means to said pump, the driving power being generated by the vehicle engine separate from said power brake system.

4. A power brake system adapted to derive driving power from a power plant separate from said power brake system, said system comprising:
    a master cylinder,
    a power brake booster operable to actuate said master cylinder,
    a brake pedal movable to control the operation of said booster and to act through said booster on said master cylinder to actuate said master cylinder,
    a fluid pressurizing pump fluid connected to said booster to selectively provide fluid pressure thereto for operating said booster, means selectively delivering driving power from the power plant to operate said pump, said means including selectively and variably energizable clutch means for determining the amount of driving power delivered to said pump and thus controlling the amount of fluid pressure delivered by said pump to operate said booster, and control means for variably energizing said clutch means, said clutch means being responsive to brake actuating movement of said brake pedal to cause energization of said clutch means corresponding to the brake pedal position reflecting the amount of master cylinder actuation desired by the operator, said pump acting under control of said control means upon decrease or cessation of brake demand by the operator to reduce the fluid pressure operating said booster accordingly, said master cylinder being operable manually by said brake pedal through said booster when no fluid pressure is available from said pump to operate said booster when said brake pedal is moved by the operator in the brake actuating direction.

* * * * *